(12) United States Patent
Kang et al.

(10) Patent No.: US 11,943,591 B2
(45) Date of Patent: Mar. 26, 2024

(54) SYSTEM AND METHOD FOR AUTOMATIC DETECTION OF MUSIC LISTENING REACTIONS, AND MOBILE DEVICE PERFORMING THE METHOD

(71) Applicant: KOREA UNIVERSITY OF TECHNOLOGY AND EDUCATION, INDUSTRY-UNIVERSITY COOPERATION FOUNDATION, Chungcheongnam-do (KR)

(72) Inventors: Seungwoo Kang, Cheonan (KR); Euihyeok Lee, Cheonan (KR); Chulhong Min, Daejeon (KR)

(*) Notice: Subject to any disclaimer, the term of this patent is extended or adjusted under 35 U.S.C. 154(b) by 0 days.

(21) Appl. No.: 17/565,894

(22) Filed: Dec. 30, 2021

(65) Prior Publication Data
US 2023/0171541 A1  Jun. 1, 2023

(51) Int. Cl.
| | |
|---|---|
| H04R 3/00 | (2006.01) |
| G06F 1/16 | (2006.01) |
| G10L 25/63 | (2013.01) |
| G10L 25/78 | (2013.01) |
| H04R 1/10 | (2006.01) |
| H04R 5/04 | (2006.01) |

(52) U.S. Cl.
CPC ............ *H04R 3/005* (2013.01); *G06F 1/163* (2013.01); *G06F 1/1694* (2013.01); *G10L 25/63* (2013.01); *G10L 25/78* (2013.01); *H04R 1/1091* (2013.01); *H04R 5/04* (2013.01)

(58) Field of Classification Search
None
See application file for complete search history.

(56) References Cited

U.S. PATENT DOCUMENTS

| | | | | |
|---|---|---|---|---|
| 10,728,676 | B1* | 7/2020 | El Guindi | H04R 25/43 |
| 11,509,964 | B2* | 11/2022 | Wilkinson | H04N 21/422 |
| 2020/0204874 | A1* | 6/2020 | Sasaki | G06F 16/9535 |
| 2020/0243055 | A1* | 7/2020 | Grace | G09B 5/04 |
| 2022/0257162 | A1* | 8/2022 | Georganti | A61B 5/7264 |

* cited by examiner

*Primary Examiner* — Paul W Huber
(74) *Attorney, Agent, or Firm* — Cho-Won IP Consulting; Hyun Ho Song

(57) ABSTRACT

Disclosed herein is a system for automatic detection of music listening reactions, comprising a wearable sensor and a mobile device. The wearable sensor is worn on the listener's ear. The mobile device receives an inertial signal and a sound signal of the listener from the wearable sensor. The mobile device determines a vocal reaction of the listener based on the inertial signal, the sound signal and music information of the music being played and a motion reaction of the listener based on the inertial signal and the music information. Other embodiments are described and shown.

7 Claims, 11 Drawing Sheets

| Class of Step 2.1 | Final Class |
| --- | --- |
| humming,music,chant,singing | Singing/humming |
| whistling | whistling |
| speech | ambiguous |
| others | non-reaction |

SYSTEM AND METHOD FOR AUTOMATIC DETECTION OF MUSIC LISTENING REACTIONS, AND MOBILE DEVICE PERFORMING THE METHOD

BACKGROUND

1. Field of the Invention

The present disclosure relates to a system and method for automatic detection of music listening reactions, and mobile device performing the method. In particular, the present disclosure relates to a system and method, and mobile device using the method, to automatically detect a music listener's reaction (e.g., user's singing along, humming, whistling, (head) nodding, etc.), using a wearable sensor worn by a user on the ears.

2. Description of Related Art

Listening to music is an important part of our life. According to a research, music consumer listened to music for more than 2.6 hours per day in 2019, and this is equivalent to listening to 52 songs every day.

People often nod their heads or tap their feet, when they hear their favorite song or music. Sometimes they give hum, or sing along to the song. These reactions are natural and may be seen as a characteristic that shows the listener's immersion in music.

If it is possible to automatically detect the listener's reaction to music, various applications using the reaction may be implemented. However, it is not a simple task to automatically detect such reaction in real-life situations.

BRIEF SUMMARY

To solve such and other problems, an object of the present disclosure is to provide a system to automatically detect music listening reaction (e.g., user's singing along, humming, whistling, (head) nodding, etc.), using a wearable sensor worn by a user on the ears.

Another object of the present disclosure is to provide a method to automatically detect music listening reaction.

Another object of the present disclosure is to provide a mobile device performing the method to automatically detect music listening reaction.

According to an embodiment of the present disclosure, a system for automatic detection of music listening reactions may comprise a wearable sensor, worn on a listener's ear, and a mobile device, receiving an inertial signal and a sound signal of the listener from the wearable sensor, determining a vocal reaction of the listener based on the inertial signal, the sound signal, and music information of the music being played, and determining a motion reaction of the listener based on the inertial signal and the music information.

According to an embodiment, the application may further include an application for receiving reaction information including the vocal reaction and the motion reaction from the mobile device, and outputting a request for the reaction information and music reproduction information to the mobile device.

According to an embodiment, the mobile device may comprise a filter unit, determining a non-reaction event based on the inertial signal and the sound signal; and a classifier unit, classifying the vocal reaction and the motion reaction by using deep learning in a data segment for an event other than the non-reaction event; wherein the data segment determined as the non-reaction event by the filter unit does not pass through the classifier unit.

According to an embodiment, the mobile device may further comprise a network interface, communicating with the wearable sensor; a post-processing unit, correcting the vocal reaction and the motion reaction and analyzing the vocal reaction and the motion reaction; a data receiver unit, receiving the music information and outputting the music information to the classifier unit; an application programming interface, outputting reaction information including the vocal reaction and the motion reaction to an application and receiving a request for the reaction information; and a scheduler unit, controlling operation of the mobile device based on the request.

According to an embodiment, the filter unit may determine as a vocal non-reaction event in the inertial signal, a data segment in which the listener's movement level is lower than a first movement threshold; the filter unit may determine as the vocal non-reaction event in the inertial signal, a data segment in which the listener's movement level is greater than a second movement threshold is determined as the vocal non-reaction event; and the filter unit may determine as the vocal non-reaction in the sound signal, a data segment in which the loudness of the sound is less than a sound threshold. The filtering of the inertial signal may be performed before filtering of the sound signal.

According to an embodiment, the filter unit may determine as a motion non-reaction event in the inertial signal, a data segment in which the listener's movement level is lower than a third movement threshold; and the filter unit may determine as a motion non-reaction event in the inertial signal, a data segment in which the listener's movement level is higher than a fourth movement threshold.

According to an embodiment, the classifier unit may comprise a vocal reaction classifier, determining the vocal reaction by comparing a pitch level of notes of the music information with a pitch level of notes of the sound signal received from the wearable sensor; and a motion reaction classifier, determining the motion reaction by comparing a beat of the music information with the inertial signal received from the wearable sensor.

According to an embodiment, the motion reaction classifier may use a feature which encodes a periodicity of the inertial signal, and the feature that encodes the periodicity may include at least one of: a number of autocorrelation peaks of the data segment of the inertial signal, a maximum value of the autocorrelation peaks of the data segment, a time interval between first autocorrelation peak and last autocorrelation peak of the data segment, a number of zero crossings of a waveform of the data segment, a mean of time intervals between consecutive peaks of the autocorrelation peaks of the data segment, and a standard deviation of the time intervals between the consecutive peaks of the autocorrelation peaks of the data segment.

According to an embodiment, the motion reaction classifier may use a feature which is related to the beat of the music information. The beat-related feature may include at least one of: a ratio of a number of peaks of the data segment to a number of the beats in a window, a ratio of a median of a time interval between consecutive peaks of the data segment to a median of a time interval between consecutive beats of the music information, and a ratio of a standard deviation of the time interval between the consecutive peaks of the data segment to the mean of the time interval between consecutive beats of the music information.

According to an embodiment of the present disclosure, a method for automatic detection of a listener's music listening reactions may comprise: sensing an inertial signal and a sound signal using a sensor, determining a non-reaction event based on the inertial signal and the sound signal, and classifying in or with respect to a data segment for other than the non-reaction event, the listener's vocal reaction and the listener's motion reaction using deep learning. The vocal reaction may be determined based on the inertial signal, the sound signal, and music information of the music played. The motion reaction may be determined based on the inertial signal and the music information. The data segment which is determined as the non-reaction event may not pass the step of classifying the vocal reaction and the motion reaction.

According to another embodiment, the mobile device may comprise a filter unit and a classifier unit. The filter unit may receive the listener's inertial signal and the sound signal from the wearable sensor, and determine the non-reaction event based on the inertial signal and the sound signal. For the data segment which are not the non-reaction event, the classifier may determine: the vocal reaction of the listener based on the inertial signal, the sound signal, and the music information of the music played; and the motion reaction of the listener based on the inertial signal and the music information. The data segment determined as the non-reaction event by the filter unit may not pass through the classifier unit.

The system for automatic detection of a listener's music listening reactions may automatically detect in real-time music listening reaction (e.g., user's singing along, humming, whistling, (head) nodding, etc.), using the wearable sensor worn by the user.

By utilizing musical structures such as pitch and beat, a listener's reaction may be accurately detected.

Also, since non-reaction event is initially (e.g., at an early stage) filtered or pre-filtered by the filter unit of the mobile device, unnecessary processing cost may be reduced.

DETAILED DESCRIPTION

Figure 1:
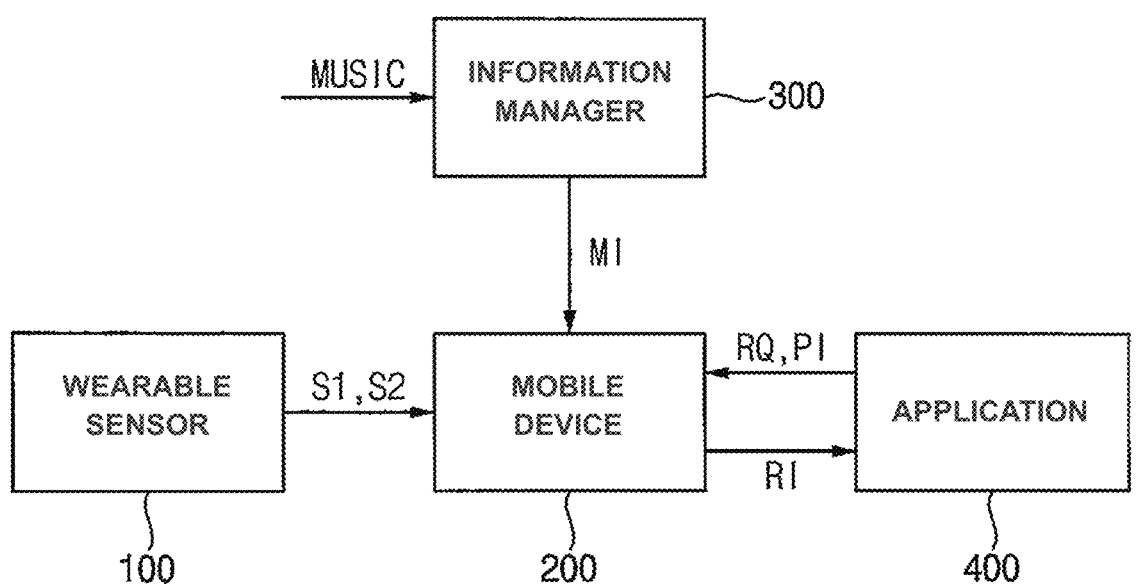
FIG. 1 shows a block diagram of a system for automatic detection of music listening reactions, according to an embodiment.

Hereinafter, various embodiments of the present invention are shown and described. Particular embodiments are exemplified herein and are used to describe and convey to a person skilled in the art, particular structural, configurational and/or functional, operational aspects of the invention. The present invention may be altered/modified and embodied in various other forms, and thus, is not limited to any of the embodiments set forth.

The present invention should be interpreted to include all alterations/modifications, substitutes, and equivalents that are within the spirit and technical scope of the present invention.

Terms such as "first," "second," "third," etc. herein may be used to describe various elements and/or parts but the elements and/or parts should not be limited by these terms. These terms are used only to distinguish one element and/or part from another. For instance, a first element may be termed a second element and vice versa, without departing from the spirit and scope of the present invention.

When one element is described as being "joined" or "connected" etc. to another element, the one element may be interpreted as "joined" or "connected" to that another element directly or indirectly via a third element, unless the language clearly specifies. Likewise, such language as "between," "immediately between," "neighboring," "directly neighboring" etc. should be interpreted as such.

Terminology used herein is for the purpose of describing particular exemplary embodiments only and is not intended to limit the present invention. As used herein, singular forms (e.g., "a," "an") include the plural forms as well, unless the context clearly indicates otherwise. The language "comprises," "comprising," "including," "having," etc. are intended to indicate the presence of described features, numbers, steps, operations, elements, and/or components, and should not be interpreted as precluding the presence or addition of one or more of other features, numbers, steps, operations, elements, and/or components, and/or grouping thereof.

Unless otherwise defined, all terms (including technical and scientific terms) used herein have same meaning as those commonly understood by a person with ordinary skill in the art to which this invention pertains. Terms, such as those defined in commonly used dictionaries, should be interpreted as having meaning that is consistent with their meaning in the context of the relevant art and should not be interpreted in an idealized or overly formal sense unless expressly so defined herein.

Hereafter, various embodiments of the present invention are described in more detail with reference to the accompanying drawings. Same reference numerals are used for the same elements in the drawings, and duplicate descriptions are omitted for the same elements or features.

FIG. 1 shows a block diagram of a system for automatic detection of music listening reactions, according to an embodiment.

Referencing FIG. 1, the system for automatic detection of music listening reactions may comprise a sensor (100), mobile device (200), and information manager (unit) (300).

For example, the sensor (100) may be a wearable sensor attached to or worn at a user's ears. The wearable sensor (100) may be a wireless earphone type (e.g., earbud). The wearable sensor (100) may comprise an inertial sensor and microphone; the inertial sensor may be an accelerometer, gyroscope, magnetometer, with 3 axes.

The wearable sensor (100) may output a first sensing data (S1) of the inertial sensor and a second sensing data S2 of the microphone to the mobile device (200). The first sensing data (S1) may include an inertial signal. The second sensing data (S2) may include a sound signal.

The mobile device (200) may receive the first sensing data (S1) and the second sensing data (S2) from the wearable sensor (100). The mobile device (200) may receive music information (MI) from the information manager (300).

The mobile device (200) may determine a vocal reaction based on the first sensing data (S1), the second sensing data (S2), and the music information (MI). The mobile device (200) may determine a motion reaction based on the first sensing data (S1) and the music information (MI). For example, the vocal reaction may include a singing (along) event, a humming event, and a whistling event. For example, the motion reaction may include a (head) nodding event.

The information manager (300) may generate the music information (MI) by analyzing a/the music (MUSIC), and may output the music information (MI) to the mobile device (200). For example, the information manager (300) may be located in a server. Alternatively, the information manager (300) may be a unit included in the mobile device (200).

The information manager (300) may operate in real-time or offline, a/the process of analyzing the music (MUSIC) and generating the music information (MI). The music information (MI) may include pitch (of a note or tone highness or lowness of sound) and beat of a sound.

The system for automatic detection of music listening reactions may further comprise an application (400). The application (400) may receive reaction information (RI) from the mobile device (200). The reaction information (RI) may include the vocal reaction and the motion reaction. The application (400) may output a request (RQ) for the reaction information (RI) to the mobile device (200). Also, when the application (400) is a music (re)play/playback application, music play information (PI) may be output to the mobile device (200).

For example, the application (400) may be an automatic music rating application. A conventional music player may determine a user's preference for a song by relying on the user's manual input and simple statistics such as the number of plays. The application (400) may predict and apply a music rating based on the automatically generated reaction information (RI) in the mobile device (200).

For example, the application (400) may be a reaction-based music recommendation application. Streaming service providers may value the creation of user-defined and -personalized playlists to attract more consumers and make it easier for consumers to find music that suits their tastes. The application (400) may perform a music recommendation using how the user participates in the song or music being listened to, for example, to which song he/she frequently responds, which part of the song he/she responds to, what kind of reaction he/she shows, etc. That is, the application (400) may predict a user's taste or preference in detail based on the reaction information (RI), perform the music recommendation based on the reaction information (RI), and create a playlist.

For example, the application (400) may be a remote communication enhancement application for a musician. Many musicians are conducting live online concerts due to COVID-19. Fans can still enjoy the music of their favorite musicians through the online platform. However, it is difficult to show a reaction to musicians as at an offline concert. At offline concerts, the fans often sing to the music or move their body with a light stick, and musicians can see their fans doing them. However, this type of interaction is very limited at online concerts, and the fans can only express their feelings by sending chat texts or emoticons.

The application (400) may be used to enrich interactions between musicians and remote fans. The application (400) may detect and collect reactions of the fans watching live performances online. The application (400) may provide the collected reaction to the musician. For example, the application (400) may synthesize the vocal reaction and the motion reaction into a concert video and deliver it to the musician.

Figure 2:
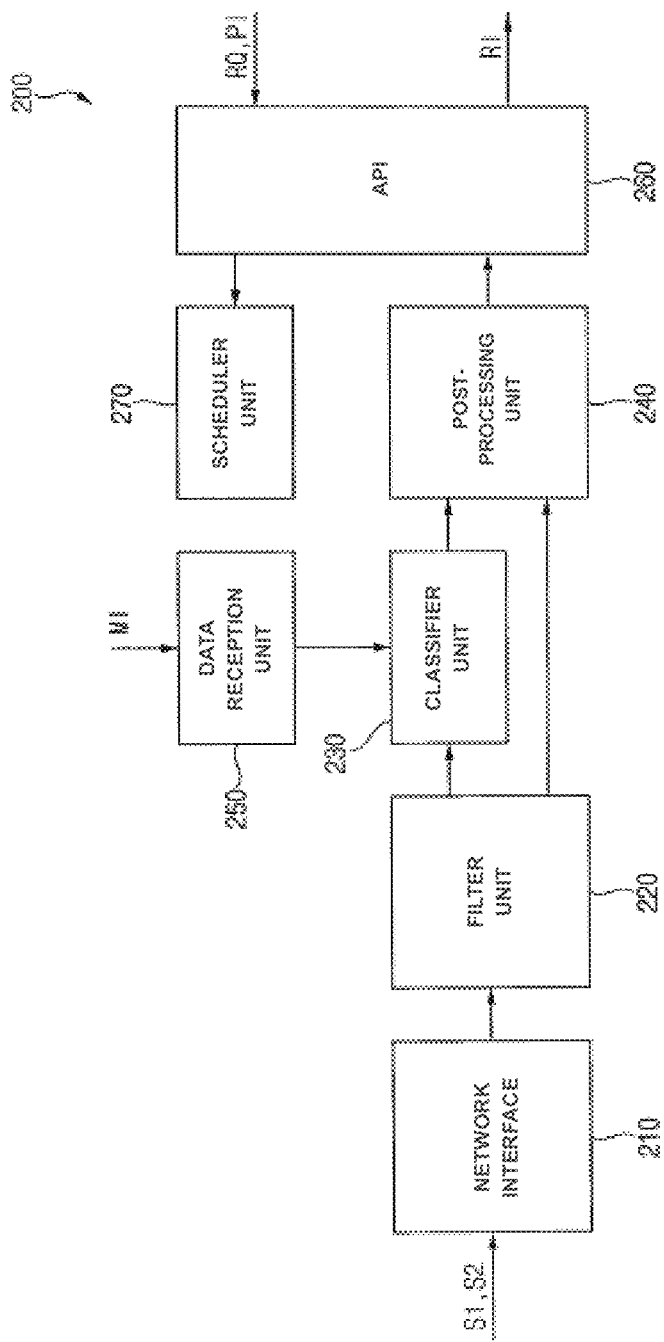
FIG. 2 shows a block diagram of a mobile device of FIG. 1, according to an embodiment.
Figure 3:
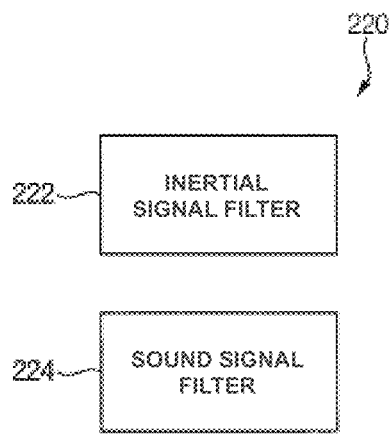
FIG. 3 shows a block diagram of a filter (unit) of FIG. 2, according to an embodiment.
Figure 4:
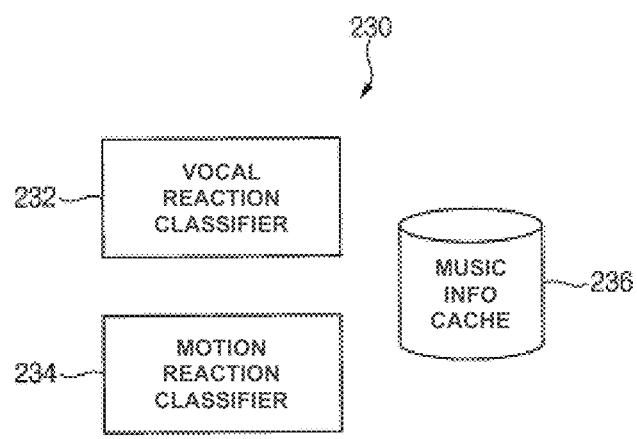
FIG. 4 shows a block diagram of a classifier (unit) of FIG. 2, according to an embodiment.
Figure 5:
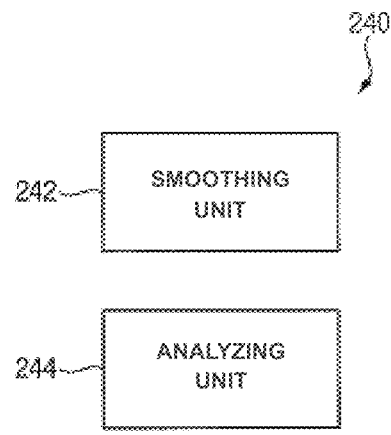
FIG. 5 shows a block diagram of a post-processing unit of FIG. 2, according to an embodiment.
Figure 6:
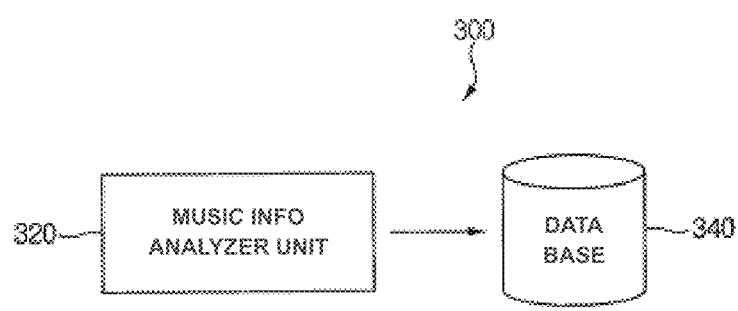
FIG. 6 shows a block diagram of an information manager (unit) of FIG. 1, according to an embodiment.

FIG. 2 shows a block diagram of the mobile device (200) of FIG. 1, according to an embodiment. FIG. 3 shows a block diagram of a filter (unit) (220) of FIG. 2, according to an embodiment. FIG. 4 shows a block diagram of a classifier (unit) (230) of FIG. 2, according to an embodiment. FIG. 5 shows a block diagram of a post-processing unit (240) of FIG. 2, according to an embodiment. And FIG. 6 shows a block diagram of the information manager (unit) of FIG. 1, according to an embodiment.

Referencing FIG. 2 through FIG. 6, the mobile device (200) may comprise the filter unit (220), classifier (unit) (230), and post-processing unit (240). The mobile device (200) may further comprise a network interface (210), data receiver or reception unit (250), API (application programming interface) (260), and scheduler (unit) (270).

The network interface (210) may be an interface unit for communication with the wearable sensor (100). The network interface (210) may receive the first sensing data (S1) and the second sensing data (S2) from the wearable sensor (100). The network interface (210) may output the first sensing data (S1) and the second sensing data (S2) to the filter unit (220).

The filter unit (220) may determine non-reaction event the first sensing data (S1) and the second sensing data (S2). The filter unit (220) may bypass the classifier unit (230) for or with respect to the non-reaction event. The filter unit (220) may provide an event other than the non-reaction event to the classifier unit (230). The non-reaction event may be a potential vocal reaction event or a potential motion reaction event.

The filter (220) may filter early at start, or pre-filter non-reaction event, and accordingly, processing cost may be reduced.

The filter unit (220) may comprise an inertial signal filter (222) and a sound signal filter (224). The inertial signal filter (222) may filter the inertial signal of the first sensing data (S1). The sound signal filter (224) may filter the sound signal of the second sensing data (S2).

The classifier unit (230) may classify the vocal reaction and the motion reaction based on the potential vocal reaction event and the potential motion reaction signal received through the filter unit (220).

The classifier unit (230) may comprise a vocal reaction classifier (232), a motion reaction classifier (234), and a music information cache (236). The vocal reaction classifier (232) and the motion reaction classifier (234) may classify the vocal reaction and the motion reaction by using deep learning.

The vocal reaction classifier (232) may determine the vocal reaction by comparing the pitch of the music stored in the music information cache (236) with the pitch of the second sensing data (S2) transmitted from the wearable sensor (100). For example, the vocal reaction may include the singing along event, the humming event, and the whistling event.

The motion reaction classifier (234) may determine the motion reaction by comparing the beat of the music stored in the music information cache (236) with a/the signal of the first sensing data (S1) transmitted from the wearable sensor (100). For example, the motion reaction may include the nodding event.

The post-processing unit (240) may correct or revise the vocal reaction of the vocal reaction classifier (232) and the motion reaction of the motion reaction classifier (234).

For example, when the sing-along event is determined to have occurred for a long time, and then the non-reaction event is determined for a brief time, and then the singing along event is determined to have occurred for a long time again, the post-processing unit (240) may determine that the sing along event has continuously occurred without a pause by using a smoothing algorithm.

The post-processing unit (240) may comprise a smoothing unit (242) and an analyzing unit (244). The smoothing unit (242) may generate a final vocal reaction result by smoothing vocal reaction result of the vocal reaction classifier (232). The smoothing unit (242) may generate a final motion reaction result by smoothing motion reaction result of the motion reaction classifier (234). The smoothing unit (242) may utilize a Hidden Markov Model (HMM) technique. Alternatively, the smoothing unit (242) may utilize a majority voting technique.

The vocal reaction information and the motion reaction information may include a reaction type, a start time and an end time, etc. The analyzing unit (244) may generate additional information about the vocal reaction and the motion reaction. For example, the analyzing unit (244) may aggregate events, such as which part of a song the user sang the most. For example, the analyzing unit (244) may grade/score the vocal reaction according to a degree of similarity by comparing the user's audio signal with the song played.

The information manager (300) may comprise a music information analyzer unit (320) and a database (340). The music information analyzer unit (320) may analyze pitch information and beat information of the music. The database (340) may store the pitch information and the beat information. As disclosed, analyzing the information may be time-consuming, and thus the analyzing may not be performed during play/playback of the music, or the analyzing may be performed prior to the play/playback. For example, the music information analyzer unit (320) may analyze the pitch information and the beat information for the user's playlist and store in the database (340).

The data reception unit (250) may receive the music information (MI) including the pitch information and the beat information from the database (340) of the information manager (300). The data reception unit (250) may output the music information (MI) to the music information cache (236) of the classifier unit (230).

The API (260) may be an application for the mobile device (200) for communicating with the application (400). The API (260) may output the reaction information (RI) to the application (400).

The API (260) may receive the request (RQ) for the reaction information (RI) and the music play information (PI) from the application (400).

The scheduler (270) may control overall operation of the mobile device (200) based on the request (RQ). For Example, when the request (RQ) demands only the vocal reaction, operations related to the motion reaction of the mobile device (200) may be inactivated. For example, when the request (RQ) demands only the motion reaction, operations related to the vocal reaction of the mobile device (200) may be inactivated. For example, when the request (RQ) is not received, operations related to the vocal reaction and the motion reaction of the mobile device (200) may be inactivated.

Figure 7:
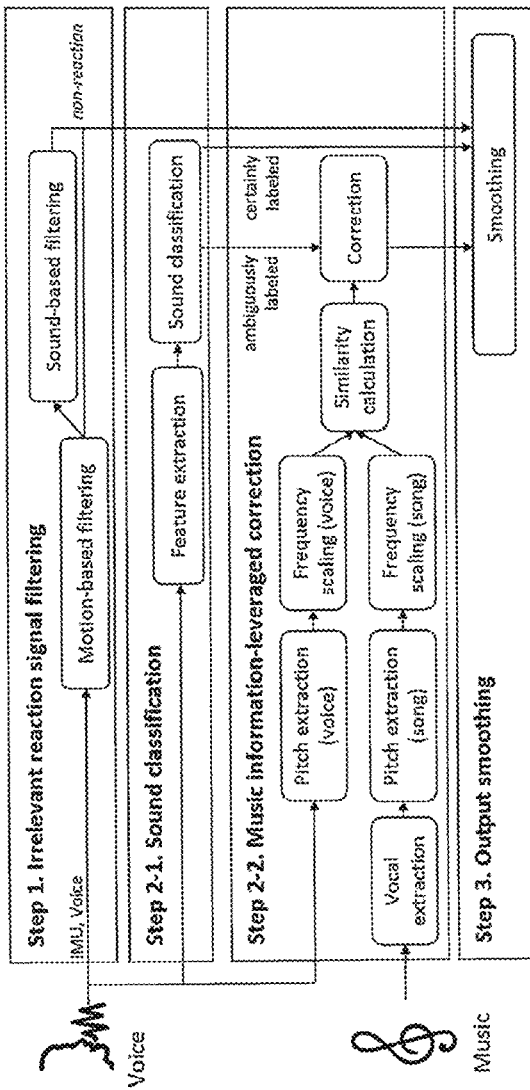
FIG. 7 shows a conceptual diagram showing a sensing pipeline of vocal reaction detection of a system for automatic detection of music listening reactions, according to an embodiment.
Figure 8:
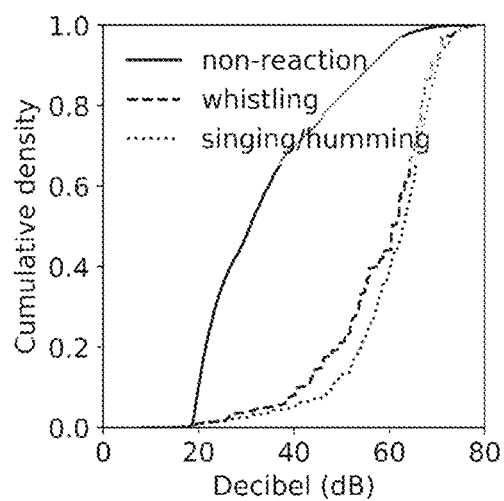
FIG. 8 shows a graph showing a cumulative distribution (density) function of a sound level for a vocal reaction, according to an embodiment.
Figure 9:
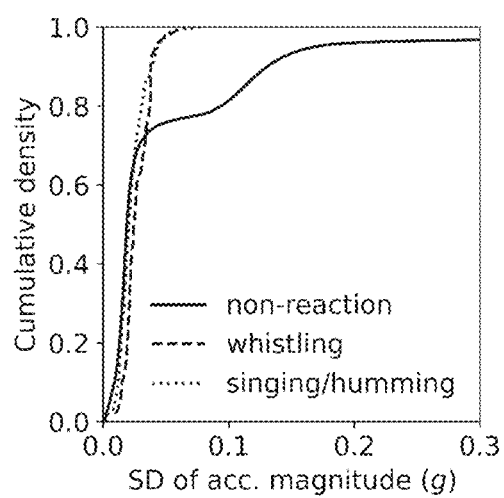
FIG. 9 shows a graph showing a cumulative distribution (density) function of a motion level for a vocal reaction, according to an embodiment.
Figures 10, 11:
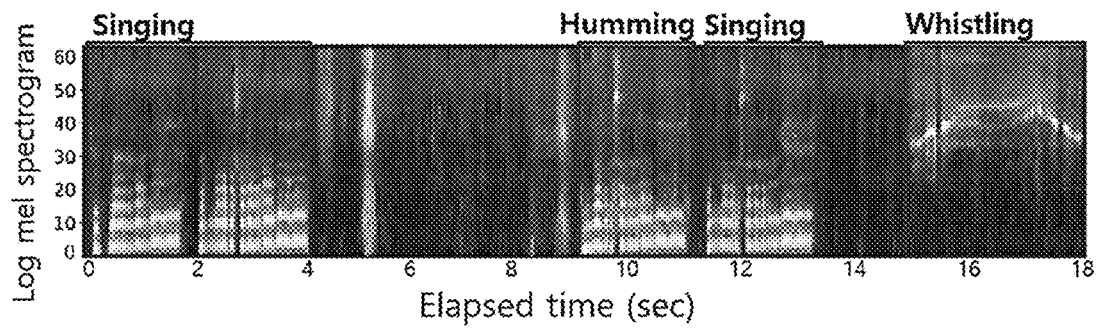
FIG. 10 shows a log-Mel spectrogram pattern used in (Step 2-1) of FIG. 7, according to an embodiment.
FIG. 11 shows table showing a process of mapping a label of (Step 2-1) of FIG. 7 to a label of (Step 2-2) of FIG. 7, according to an embodiment.
Figure 12:
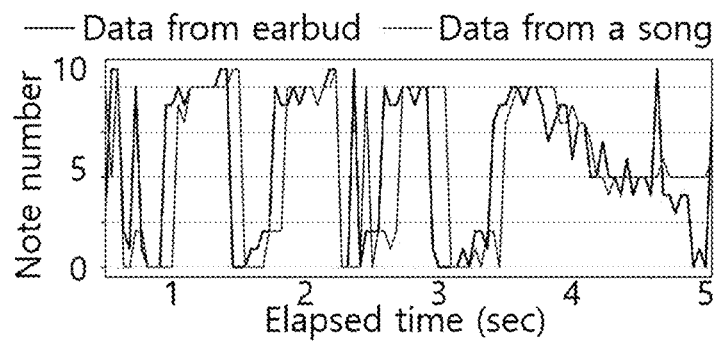
FIG. 12 shows a graph showing sensing data and music information data for a song sing-along event, according to an embodiment.
Figure 13:
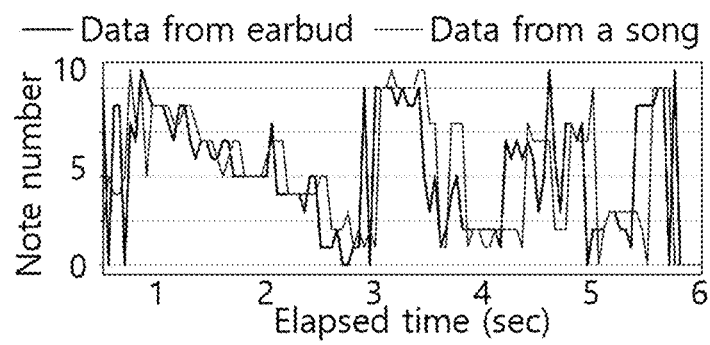
FIG. 13 shows a graph showing sensing data and music information data for a humming event, according to an embodiment.
Figure 14:
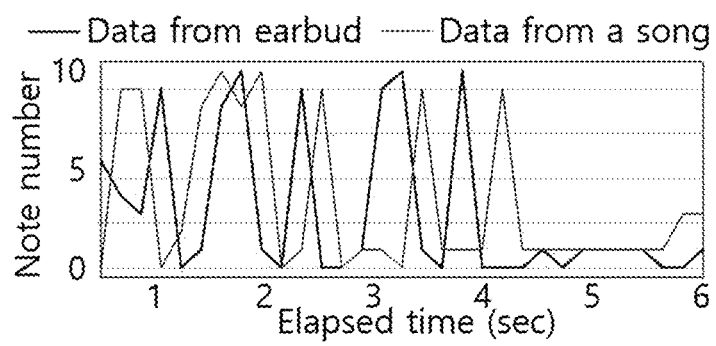
FIG. 14 shows a graph showing sensing data and music information data for a whistling event, according to an embodiment.

FIG. 7 shows a conceptual diagram showing a sensing pipeline of vocal reaction detection of the system for automatic detection of music listening reactions of FIG. 1, according to an embodiment. FIG. 8 shows a graph showing a cumulative distribution (density) function of a sound level for a vocal reaction, according to an embodiment. FIG. 9 shows a graph showing a cumulative distribution (density) function of a motion level for a vocal reaction, according to an embodiment. FIG. 10 shows a log-Mel spectrogram pattern used in (Step 2-1) of FIG. 7, according to an embodiment. FIG. 11 shows table showing a process of mapping a label of (Step 2-1) of FIG. 7 to a label of (Step 2-2) of FIG. 7, according to an embodiment.

Referencing FIG. 1 to FIG. 15, the system may search or acquire music information (MI) of a song and maintain the music information (MI) in the database (340) of the information manager (unit) (300).

When a listener starts listening to a song, the system may activate audio/sound and motion detection at the wearable sensor (100), and send the sensing data (S1, S2) to the mobile device (200).

According to an embodiment, the present system's operation is as follows.
  (1) As a first step, a/the data segment which is reliably classifiable as the non-reaction event may be filtered by analyzing the features of the sensing data (S1, S2).
  (2) For an uncertain data segment other than the non-reaction event, the system may identify a reaction event using the classifier (230).
  (3) The present system may improve the classification performance of the classifier unit (230) by using the music information (MI) retrieved from the song being played. The system may correct a classified label according to a similarity calculated between the sensing data (S1, S2) and the music information (MI).

(4) Based on the detected reaction event, the system may perform post-processing to determine a rate/speed of the nod and the similarity between the user's singing along to melody of the song replayed. In addition, the system may apply smoothing in (the) post-processing of the vocal reactions.

When the vocal reaction is generated, the vocal reaction may not continue (e.g, without a pause) within a session and may appear sporadically, sometimes alternatingly with other reactions. For example, the listener may pause the song for a short time to breathe while singing along. Also, the listener may often alternate between different types of vocal reactions. For example, there are many incidents where: when the listener does not know the lyrics while singing along, he or she may momentarily hum or whistle, and when the listener knows the lyrics, he/she may sing along to the song again.

To solve such and other problems, presently disclosed is a pipeline for efficient and robust, reliable detection of the vocal reactions.

The present system may apply an early-stage filtering operation to reduce cost ((Step 1) of FIG. 7). In the early-stage filtering operation, data segment which may be reliably classifiable as the non-reaction event may be identified, and a relatively burdensome classification operation may not be performed on the corresponding segment.

Identification logic is developed considering the following two criteria.

First, since a distance between the microphone of the wearable sensor (100) and the listener's mouth is close, the listener's voice reaction may generate a sound event of a specific volume or of a higher volume. Accordingly, no sound, or a sound below a certain volume (sound threshold), such as background noise, may be labeled as the vocal non-reaction event.

FIG. 8 shows the cumulative distribution (density) function of 1-second decibel for or with respect to reaction event and non-reaction event. As shown in FIG. 8, the level (decibel) of sound is relatively small for non-reaction, but relatively large in the singing along, humming, and whistling events.

For example, when the sound threshold is set to 30 decibels and sound data of less than 30 decibels is processed as the non-reaction event, approx. 60% of the non-reaction events may not pass through the classifier unit (230), and more than approx. 95% of the reaction events may pass through the classifier unit (230).

Second, the listener's voice reaction may also generate a specific level of movement in the wearable sensor (100). When the listener's mouth movement causes a/the vocal reaction, an impulse response may be generated to the inertial signal of the wearable sensor (100) by activating the cheekbone muscle located between the mouth and the ear.

Also, when no movement is detected by the wearable sensor (100), this means that there is little possibility that the audio signal belongs to the reaction event.

FIG. 9 shows a graph showing a cumulative distribution (density) function of a motion level for the vocal reaction, according to an embodiment. Referencing FIG. 9, the listener's large movement may be known to be related to his/her non-reaction. This is because, while the listener makes big movements, such as walking and jumping, the listener rarely makes the vocal reaction.

Accordingly, when the listener's movement is less than a first movement threshold (or there is little movement), it may be labeled as the vocal non-reaction event. When the listener's movement is greater than a second movement threshold (or when the movement is a big movement), it may be labeled as the vocal non-reaction event.

Consequently, the filter unit (220) may determine the vocal non-reaction event by using both the first sensing data (S1), which includes the inertial signal of the wearable sensor (100), and the second sensing data (S2), which includes the sound signal.

Based on the above results, a two-stage filtering component configuration may be designed. First, a segment in which the motion level, which is defined by a standard deviation of an accelerometer size, is out of a range of preset interval (e.g., between a first motion threshold of 0.006 and a second motion threshold of 0.1) may be determined as the vocal non-reaction event.

Then for an unfiltered segment, if the volume (decibel) of the corresponding audio signal is smaller than the sound threshold, the data segment may be filtered as the vocal non-reaction event.

Motion-based filtering (inertial signal filter 222) is superior to sound-based filtering (sound signal filter 224) because motion-based filtering (inertial signal filter 222) is lighter than sound-based filtering (sound signal filter 224). can be done first. The filtered segments may be labeled as non-reactive and transmitted to the post-processing unit 240 without performing classification.

For example, in a/the sound event classification, three types of the vocal reactions of singing/humming, whistling, and non-reaction may be determined as target events. Here, singing along and humming are often observed alternately, and as shown in FIG. 10, the spectrogram patterns may be very similar and it may difficult to actually distinguish them, so they can be combined into one class.

A first part of the sound event classification ((Step 2-1) in FIG. 7) may include two tasks: Feature extraction and Sound classification.

Feature Extraction:

For example, audio data of the wearable sensor (100) may be resampled at 16 kHz and divided into segments having a length of 1 second. Then, the segment may be transformed into a spectrogram using a Short Time Fourier Transform with a periodic Hann window. The window size and window hop may be set to 25 ms and 10 ms, respectively. The log-Mel spectrogram may then be calculated by mapping the spectrogram to 64 mel bins in a range of 125 to 7,500 Hz and applying the logarithm. Finally, the feature may be framed into a matrix of 96*64. Here, 96 may mean 96 frames having 10 ms, and 64 may mean 64 mel bands of each frame.

Classification and Label Mapping:

The class of sound classification in (Step 2.1) may have hum, music, chant, song, whistle, speech, bird sound, dog sound, silence, and the like. Since the class of (Step 2.1) may not exactly match a final class of the present system, the label may be mapped through the mapping table shown in FIG. 11. As shown in FIG. 11, hum, music, chant, and song among the sound classification classes of (Step 2.1) may be mapped to the singing along and humming events of the final class, and of the sound classification of (Step 2.1), the whistle in the class can be mapped to the whistling event in the final class. Since it is ambiguous which event of the final class is matched with speech of the class of sound classification in Step 2.1, further investigation may be performed. The speech may be labeled "ambiguous." Of the sound classification class in Step 2.1, classes except the hum, music, chant, song, whistle and speech may be mapped to the non-reaction event of the final class. The non-reaction events may be directly transferred to the post-processing unit (240) without the classifying operation of the classifier unit (230).

As a next step, the music information (MI) of the song being played may be used to wrap up the ambiguous label by. More specifically, the label "ambiguous" may be modified as the sing along/humming event or the non-reaction event based on a similarity between the audio signal received from the wearable sensor (100) and the song being played.

Calculation of Similarity:

To measure a similarity between the vocal signal and the song, a melody, which is a linear sequence of musical tones, may be considered. A key intuition of the present system is that the vocal reactions follow order of the notes of the song being played, whereas the non-reaction voice signals do not.

(Step 2.2) of FIG. 7 shows a detailed procedure for such process. In order to extract the order of the notes, the pitch information may be extracted first. For example, the pitch information may be pitch information, which is frequency information at intervals of 0.1 second. The pitch information may be extracted based on a deep convolutional neural network which operates directly on a time domain waveform input.

Then, the pitch information (frequency information) may be converted into note information having an octave number.

Since the listener often sings along, hums, or whistles a song, often sounding an octave higher or lower than the music being played, the note information having the octave number may be converted again to 12-note chromatic scale without an octave number.

For the audio file of the song being played, vocal extraction may be performed prior to pitch extraction in order to focus on dominant melody line of the music. This is because the vocal reaction mainly follows voice (singing voice) rather than musical instruments. Accordingly, vocal source may be separated from the song being played.

Figure 15:
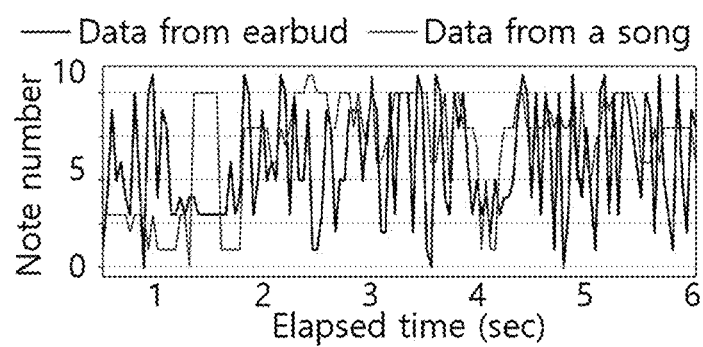
FIG. 15 shows a graph showing sensing data and music information data for a vocal non-reaction event, according to an embodiment.

Finally, the similarity between two note sequences (one from the user's vocal signal and the other from the song being played) may be calculated to reach a final decision. In such case, 12 notes (C, C #, D, D #, E, F, F #, G, G #, A, A #, B) may be mapped to 12 integer values (0 to 11). FIG. 12 to FIG. 15 show examples of note patterns. In the sing along event, humming event, and whistle event of FIG. 12, FIG. 13 and FIG. 14, the note pattern of the song played and the note pattern of the user's vocal signal have a high correlation, but for the case of non-reaction event as shown in FIG. 15, there is no correlation between the note pattern of the song played and the note pattern of the user's vocal signal. Dynamic time warping (DTW) may be considered as a similarity measurement function, because speed of two note patterns may be different. When the similarity is less than a threshold, it is finally labeled as non-reaction, but otherwise, it is labeled as sing along/humming.

In the post-processing (Step 3), the classification result may be smoothed by using the Hidden Markov Model (HMM). A core idea is to train the HMM model on the classification output sequence in the training dataset and use the trained HMM model for smoothing the output. Smoothing may be performed by defining an observation sequence as a sequence of (the) classification outputs and estimating an optimal sequence of hidden states that may be mapped to a smoothed sequence of the reaction events.

To efficiently calculate a maximum probability, the Viterbi algorithm may be applied and a 6-second window (that is, last 6 classification output sequences) may be used as input sequence. When the application (400) prefers real-time output for an interactive service, the/a smoothing operation may be omitted.

Figure 16:
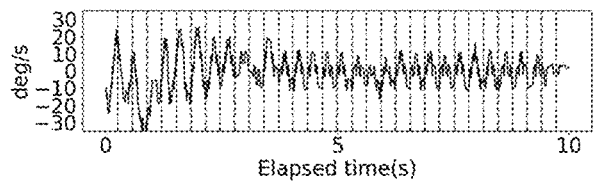
FIG. 16 shows a graph showing sensing data for a (head) nodding, according to an embodiment.
Figure 17:
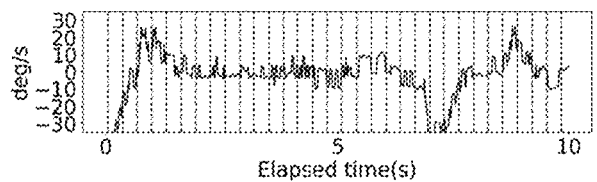
FIG. 17 shows a graph showing sensing data and music information data for a motion non-reaction event, according to an embodiment.
Figure 18:
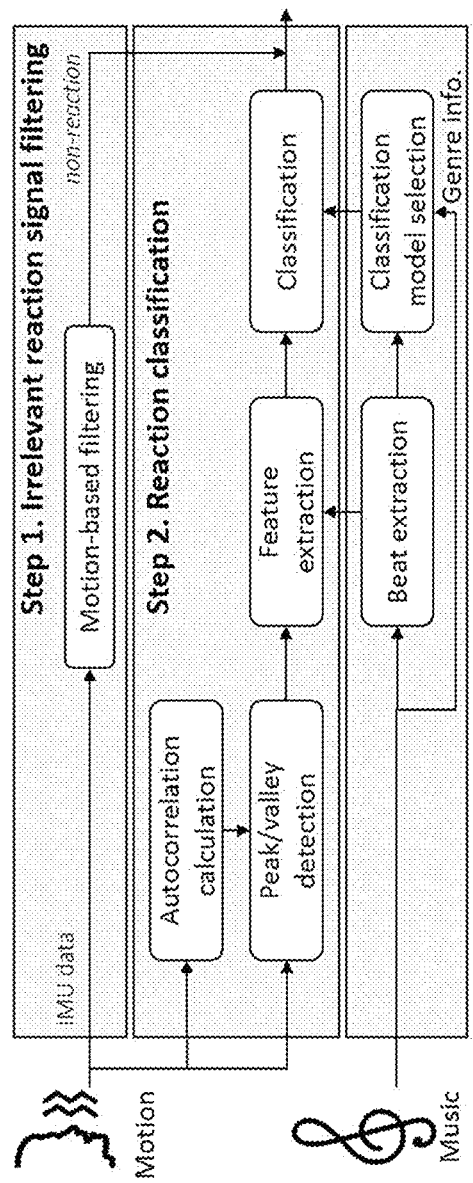
FIG. 18 shows a conceptual diagram showing a sensing pipeline of motion reaction detection of a system for automatic detection of music listening reactions, according to an embodiment.
Figure 19:
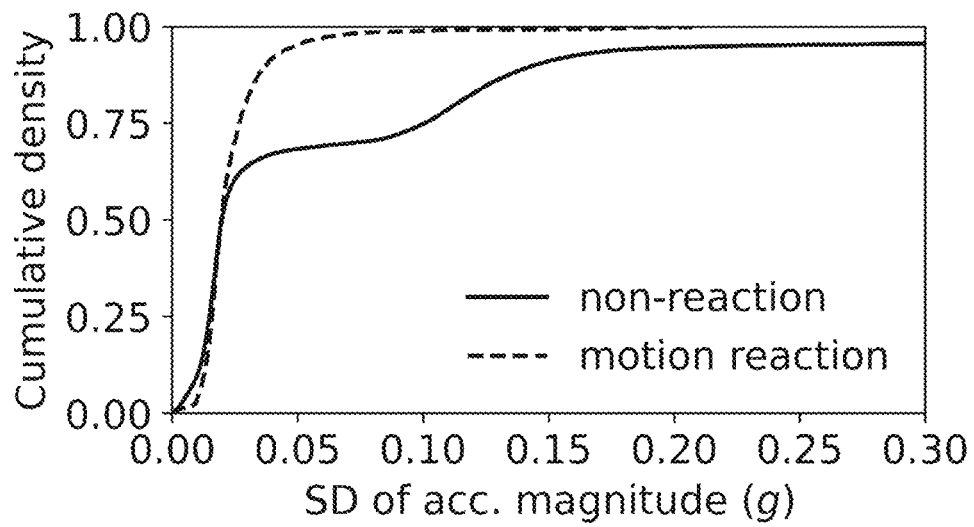
FIG. 19 shows a graph showing a cumulative distribution (density) function of a motion level for a motion reaction, according to an embodiment.
Figure 20:
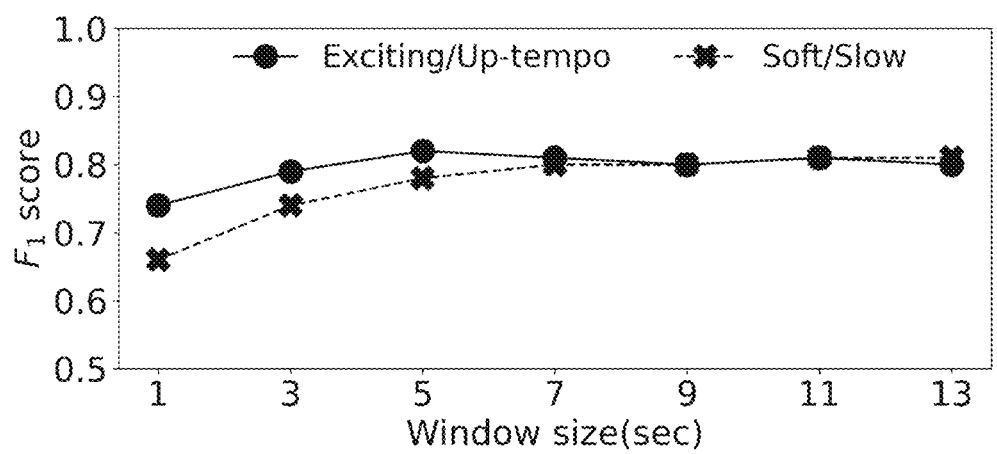
FIG. 20 shows a graph showing a method of determining a window size for a motion reaction based on music genre, according to an embodiment.

FIG. 16 shows a graph showing sensing data for a (head) nodding, according to an embodiment. FIG. 17 shows a graph showing sensing data and music information data for a motion non-reaction event, according to an embodiment. FIG. 18 shows a conceptual diagram showing a sensing pipeline of motion reaction detection of a system for automatic detection of music listening reactions, according to an embodiment. FIG. 19 shows a graph showing a cumulative distribution (density) function of a motion level for a motion reaction, according to an embodiment. And FIG. 20 shows a graph showing a method of determining a window size for a motion reaction based on music genre, according to an embodiment.

Referencing FIG. 1 through FIG. 20, motion reaction has a tendency to appear sporadically while a song is playing. Therefore, if the sensing pipeline of motion reaction detection is continuously executed, unnecessary computation cost may occur, which may interfere with user experience.

Also, motion reaction for music may be repeated at a similar cycle. For example, nodding may continue in a regular pattern for a certain period of time to generate a signal waveform having a certain level of periodicity as shown in FIG. 16. On the other hand, the non-reaction may not exhibit a periodic peak pattern as shown in FIG. 17.

However, there may be a case in which repetitive movements are shown even when not a reaction to music. For example, some listeners may habitually shake their legs, and these movements are independent of the music but may cause repetitive fluctuations in the inertial signal. Similarly, even when the listener is walking or running while listening to music, the listener's movement is independent of the music, but may cause repetitive fluctuations in the inertial signal.

In addition, the motion reaction may represent various patterns for each person. Movements and behaviors of the motion reaction may vary greatly from person to person. For example, some people may move their heads up and down while some people may move their head left and right, while listening to music Also, amount of the movement may vary from person to person. The motion reaction also may represent a different pattern according to genre of music. For example, the nodding movement tends to be more regular and more frequent for faster tempo music.

To solve such problem, the pipeline for the motion reaction detection may utilize characteristics of observed motion reaction (e.g., continuity of the reaction, periodicity, correlation with the beat of a song, difference according to the genre of music).

As shown in FIG. 18, the pipeline of the motion reaction detection may perform two main functions or operations of Filtering (Step 1) and Classification (Step 2).

First, a simple movement of the listener may be filtered, in order to avoid unnecessary processing for (the) classifying operation. A label of input data which is unlikely to correspond to a motion reaction, such as no motion or too large motion, may initially be determined as a non-reaction.

Subsequently, feature extraction may be performed to capture features of the motion reaction. Also, the pipeline may include two classification models, and one of them may be selectively used according to the genre of music.

In the Filtering (Step 1) may be performed based on a threshold, in order to reduce cost. For example, the non-reaction data may be classified based on the motion level of a 1-second segment of accelerometer signal. If there is not any listener movement, the accelerometer signal is close to zero (0). Conversely, if a walking or running motion occurs without a motion reaction to music, the accelerometer signal may fluctuate very significantly.

Accordingly, in the Filtering (Step 1), a third motion threshold for filtering out the one with a lower motion level and a fourth motion threshold for filtering the one with a higher motion level may be used. For example, when the motion level of the listener in the inertial signal is less than the third motion threshold, the corresponding data segment is determined as a motion non-reaction event; and when the motion level of the listener in the inertial signal is greater than the fourth motion threshold ion threshold, the corresponding data segment may be determined as a motion non-reaction event.

For effective filtering, it is important to set a threshold which may filter out as many non-reactions as possible without missing many motion reactions. FIG. 19 shows a graph showing a the first-order cumulative distribution (density) function of the standard deviation of the 1-second accelerometer magnitude used as a standard for the motion level. In FIG. 19, the third movement threshold, which is the lower threshold, may be 0.008 g, and the fourth movement threshold, which is the higher threshold, may be 0.075 g.

For or with respect to data not filtered in the Filtering (Step 1), the motion reaction Classification (Step 2) may be performed thereon. The Classification (Step 2) may include two steps. The first step may be to search the music information (MI) analyzed offline by the information manager (unit) (300). The beat of music may be used to derive beat-related features, and the genre of music may be used to select an appropriate classification model. To extract the beat of the music, an audio signal processing library may be used; the audio signal processing library may output a list of beat times for the music played.

In the Classification (Step 2), pre-processing, (the) feature extraction, and classification may be performed.

First, the accelerometer and gyroscope data sampled at 70 Hz may be segmented using a sliding window. Autocorrelation may be calculated using such data segments to capture the periodicity of the signal. Then, peaks and valleys may be detected in raw IMU signal and the computed autocorrelation signal. Here, the peak may be an upper vertex of the signal in the graphs of FIG. 16 and FIG. 17, and the valley may be a lower vertex of the signal in the graphs of FIG. 16 and FIG. 17.

Second, features of three groups may be calculated using the preprocessed data. The features of the three groups may include a feature which encodes the periodicity of a motion, a feature which captures the magnitude of the motion, and a feature which is related to the beat.

The feature which encodes the periodicity of motion are as follows.

Number of Autocorrelation Peaks:
Repetitive motion may show more peaks.
Maximum Value of Autocorrelation Peaks:
Higher autocorrelation peak values may indicate higher periodicity.
Time interval between First Autocorrelation Peak and Last Autocorrelation Peak:
Periodic signals may have a longer time interval.
Number of Zero Crossings:
Repetitive motion may indicate more zero crossings. Here, the zero crossing denotes the waveform passing through 0 in the graphs of FIG. 16 and FIG. 17.
Mean of Time Intervals between Consecutive Peaks
Periodic signals may have a smaller mean, average.
Standard Deviation of Time Interval between Consecutive Peaks:
Periodic signals may have a smaller standard deviation.

The features for capturing the magnitude of the movement may include a maximum/minimum/rms/mean value of the magnitude, a mean and standard deviation of the peak values, and a difference between the maximum peak value and the minimum peak value.

The beat-related features are as follows.
Ratio of Number of Peaks to Number of Beats in a Window:
The ratio of the number of peaks to the number of beats in a window may tend to be constant in motion reaction as compared to non-reaction.
Ratio of Median of Time Interval between Successive Peaks to Median of Time between Consecutive Beats:
Periodic motion reactions may tend to have peak time intervals similar to those of beats.
Ratio of Standard Deviation of Time Interval between Consecutive Peaks to Mean of Time Interval between Consecutive Beats:
Motion reactions may have more consistent intervals, and accordingly, the standard deviation may be smaller.

In the Classification (Step 2), an appropriate, balanced window size for not missing a reaction may be determined with short time duration while sufficiently capturing the periodicity of the signal. When the window size is too short, the periodicity of the signal may not be sufficiently captured. Whereas, if the window size is too long, a/the window of data may include motion reaction data and non-reaction data at a same time, thereby reducing performance.

Motion reaction to a slow-tempo song tends to be slow, whereas the motion reaction to a fast-tempo song tends to be fast. Accordingly, the window size may be determined according to the genre of the music or the tempo of the music.

As shown in FIG. 20, generally as the window size increases, the $F_1$ score may increase. However, the $F_1$ score may reach a saturation point at a specific point, and the saturation point may vary depending on the tempo of the music. In a fast-tempo song, the saturation point may be 5 seconds, and in a slow-tempo song, the saturation point may be 9 seconds.

Accordingly, the system may include two classification models having different window sizes according to the genre (or tempo) of the music After the feature extraction, a classification model matching the genre of the music played may be executed. The extracted features may be provided to the selected model to obtain a final classification output. For example, in one embodiment, a random forest (RF) may be used as the classifier unit (230). Compared with SVM, Logistics Regressions and lightBGM models, RF model may show similar or better performance.

The system may combine the output of the classifier unit (230) and the non-reaction filtering result to provide a final inference output. Here, (the) reaction information (RI) generally provided by the system is whether a motion reaction event has occurred. Also, the system may provide information on the number of motion reactions to the music played, parts the listener moves the most, and songs the listener frequently shows motion.

According an embodiment of the present disclosure, the system may automatically detect music listening reaction (e.g., user's singing along, humming, whistling, (head) nodding, etc.), using the wearable sensor (100) worn by the user on the ears.

By utilizing musical structures such as pitch and beat, a listener's reaction may be accurately detected.

Also, since non-reaction event is initially (i.e., at an early stage) filtered by the filter unit (220) of the mobile device (200), unnecessary processing cost may be reduced.

Exemplary embodiments have been described in detail with references to the accompanying drawings, for illustrative purposes (and) to solve technical problems. Although the description above contains much specificity, these should not be construed as limiting the scope of the exemplary embodiments. The exemplary embodiments may be modified and implemented in various forms and should not be interpreted as thus limited. A person skilled in the art will understand that various modifications and alterations may be made without departing from the spirit and scope of the description and that such modifications and alterations are within the scope of the accompanying claims.

REFERENCE NUMERALS:

100: Wearable Sensor
200: Mobile Device
210: Network Interface
220: Filter (Unit)
222: Inertial Signal Filter
224: Sound Signal Filter
230: Classifier (Unit)
232: Vocal Reaction Classifier
234: Motion Reaction Classifier
236: Music Information Cache
240: Post-Processing Unit
242: Smoothing Unit
244: Analyzing (Unit)
250: Data Receiver or Reception Unit
260: API
270: Scheduler Unit
300: Information Manager (Unit)
400: Application

What is claimed is:

1. A system for automatic detection of music listening reactions, comprising
a wearable sensor, worn on a listener's ear, and
a mobile device, receiving an inertial signal and a sound signal of the listener from the wearable sensor, and
determining a vocal reaction of the listener based on the inertial signal, the sound signal, and music information of the music being played, and
determining a motion reaction of the listener based on the inertial signal and the music information,
wherein the mobile device comprises:
a filter unit, determining a non-reaction event based on the inertial signal and the sound signal; and
a classifier unit, classifying the vocal reaction and the motion reaction by using deep learning in a data segment for an event other than the non-reaction event;
wherein a data segment determined as the non-reaction event by the filter unit does not pass through the classifier unit.

2. The system for automatic detection of music listening reactions of claim 1, wherein the mobile device further comprises:
a network interface, communicating with the wearable sensor;
a post-processing unit, correcting the vocal reaction and the motion reaction and analyzing the vocal reaction and the motion reaction;
a data receiver unit, receiving the music information and outputting the music information to the classifier unit;
an application programming interface, outputting reaction information including the vocal reaction and the motion reaction to an application and receiving a request for the reaction information; and
a scheduler unit, controlling operation of the mobile device based on the request.

3. The system for automatic detection of music listening reactions of claim 1, wherein the filter unit:
determines as a vocal non-reaction event, a data segment in which a movement level of the listener in the inertial signal is lower than a first movement threshold,
determines as the vocal non-reaction event, a data segment in which the listener's movement level in the inertial signal is higher than a second movement threshold, and
determines as the vocal non-reaction event, a data segment in which a volume of the sound in the sound signal is lower than a sound threshold;
determines as a motion non-reaction event, a data segment in which the listener's movement level in the inertial signal is lower than a third movement threshold, and
determines as the motion non-reaction event, a data segment in which the listener's movement level in the inertial signal is higher than a fourth movement threshold;
wherein filtering of the inertial signal is performed prior to filtering of the sound signal.

4. The system for automatic detection of music listening reactions of claim 1, wherein the classifier unit comprises:
a vocal reaction classifier, determining the vocal reaction by comparing a pitch level of the music information with a pitch level of the sound signal received from the wearable sensor; and
a motion reaction classifier, determining the motion reaction by comparing a beat of the music information with the inertial signal received from the wearable sensor.

5. The system for automatic detection of music listening reactions of claim 4, wherein the motion reaction classifier uses a feature which encodes a periodicity of the inertial signal, and
the feature that encodes the periodicity includes at least one of:
a number of autocorrelation peaks of a data segment of the inertial signal,
a maximum value of the autocorrelation peaks of the data segment of the inertial signal,
a time interval between first autocorrelation peak and last autocorrelation peak of the data segment of the inertial signal,
a number of zero crossings of a waveform of the data segment of the inertial signal,
a mean of time intervals between consecutive peaks of the autocorrelation peak of the data segment of the inertial signal, and
a standard deviation of the time intervals between the consecutive peaks of the autocorrelation peaks of the data segment of the inertial signal; and
the motion reaction classifier uses a beat-related feature of the music information, and the beat-related feature includes at least one of:
a ratio of a number of peaks of the data segment of the inertial signal to a number of the beat, or a plurality of the beat or beats, of the music information in a window,
a ratio of a median of a time interval between consecutive peaks of the data segment to a median of a time interval between consecutive beats of the music information, and a ratio of a standard deviation of the time interval between the consecutive peaks of the data segment of the inertial signal to a mean of time interval between consecutive beats of the music information.

6. A method for automatic detection of a listener's music listening reactions, comprising:

sensing an inertial signal and a sound signal using a sensor, determining a non-reaction event based on the inertial signal and the sound signal, and classifying in a data segment for other than the non-reaction event, a vocal reaction of the listener and a motion reaction of the listener using deep learning;

wherein the vocal reaction is determined based on the inertial signal, the sound signal and music information of music played, the motion reaction is determined based on the inertial signal and the music information of the music played, and a data segment determined as the non-reaction event does not pass through the classifying into the vocal reaction and the motion reaction.

7. A mobile device comprising:

a filter for receiving an inertial signal and a sound signal of a listener from a wearable sensor worn on the listener and determining a non-reaction event based on the inertial signal and the sound signal; and a classifier for determining, for a data segment other than the non-reaction event, a vocal reaction of the listener based on the inertial signal, the sound signal, and music information of played music, and a motion reaction of the listener based on the inertial signal and the music information;

wherein a data segment determined as the non-reaction event by the filter does not pass through the classifier.

* * * * *